(12) United States Patent
Chelaidite

(10) Patent No.: US 12,509,048 B2
(45) Date of Patent: Dec. 30, 2025

(54) LOAD SENSING DEVICE FOR ELECTRIC BRAKE

(71) Applicant: ZF Active Safety US Inc., Livonia, MI (US)

(72) Inventor: Galus Chelaidite, South Lyon, MI (US)

(73) Assignee: ZF ACTIVE SAFETY US INC., Livonia, MI (US)

(*) Notice: Subject to any disclaimer, the term of this patent is extended or adjusted under 35 U.S.C. 154(b) by 397 days.

(21) Appl. No.: 18/127,747

(22) Filed: Mar. 29, 2023

(65) Prior Publication Data
US 2024/0326769 A1    Oct. 3, 2024

(51) Int. Cl.
| | |
|---|---|
| *B60T 13/74* | (2006.01) |
| *F16D 65/18* | (2006.01) |
| *F16D 66/00* | (2006.01) |
| *G01L 1/22* | (2006.01) |
| *H02K 7/116* | (2006.01) |
| *H02P 23/18* | (2016.01) |
| *F16D 121/24* | (2012.01) |
| *F16D 125/40* | (2012.01) |
| *F16D 125/50* | (2012.01) |

(52) U.S. Cl.
CPC .......... *B60T 13/746* (2013.01); *F16D 65/18* (2013.01); *F16D 66/00* (2013.01); *G01L 1/22* (2013.01); *H02K 7/116* (2013.01); *H02P 23/186* (2016.02); *F16D 2066/005* (2013.01); *F16D 2121/24* (2013.01); *F16D 2125/40* (2013.01); *F16D 2125/50* (2013.01)

(58) Field of Classification Search
CPC .......... F16D 2066/005; F16D 2121/24; F16D 2125/40; F16D 215/50; B60T 13/741; G01L 5/12
See application file for complete search history.

(56) References Cited

U.S. PATENT DOCUMENTS

| | | | | |
|---|---|---|---|---|
| 4,724,917 | A * | 2/1988 | Naito ................... | B62D 5/0436 180/404 |
| 6,554,109 | B1 * | 4/2003 | Olschewski ............ | F16H 25/24 188/162 |
| 9,976,614 | B2 | 5/2018 | Gerber et al. | |

(Continued)

FOREIGN PATENT DOCUMENTS

| | | |
|---|---|---|
| DE | 10054474 C1 | 2/2002 |
| DE | 10146779 A1 | 4/2003 |

OTHER PUBLICATIONS

German Search Report for corresponding German Application Serial No. 10 2024 202 126.1, dated Nov. 14, 2024, pp. 1-8.

*Primary Examiner* — Nicholas J Lane
(74) *Attorney, Agent, or Firm* — Tarolli, Sundheim, Covell & Tummino LLP

(57) ABSTRACT

An actuator for an electric brake of a vehicle having a caliper assembly driven by a motor includes a gear train for transferring torque from the motor to the caliper assembly to brake the vehicle. The gear train has an driven gear and a sun gear connected to one another. A load sensing device senses a thrust load applied by the sun gear in response to torque generated by the motor during a braking operation. A controller is connected to the load sensing device and configured to adjust the torque applied to the gear train in response to receiving signals from the load sensing device indicative of the thrust load.

17 Claims, 10 Drawing Sheets

(56) References Cited

U.S. PATENT DOCUMENTS

| | | | |
|---|---|---|---|
| 10,228,034 B2* | 3/2019 | Yamasaki | F16D 65/14 |
| 10,808,781 B2 | 10/2020 | Yamasaki | |
| 10,906,517 B2 | 2/2021 | Hofschulte et al. | |
| 2004/0251059 A1* | 12/2004 | Haggstrom | G01L 1/2218 |
| | | | 177/211 |
| 2015/0316933 A1* | 11/2015 | Masuda | G05D 3/12 |
| | | | 310/68 B |
| 2017/0321773 A1* | 11/2017 | Lee | F16D 55/226 |
| 2017/0335910 A1* | 11/2017 | Haustein | F16D 65/0006 |
| 2018/0238408 A1* | 8/2018 | Song | F16D 65/18 |
| 2019/0331180 A1 | 10/2019 | Chelaidite | |
| 2020/0108807 A1* | 4/2020 | Ohkubo | F16D 65/183 |
| 2020/0240485 A1* | 7/2020 | Nanahara | F16D 55/226 |
| 2023/0130314 A1* | 4/2023 | Lim | F16D 55/226 |
| 2023/0146380 A1* | 5/2023 | Shin | G01L 5/12 |
| | | | 188/72.8 |

* cited by examiner

LOAD SENSING DEVICE FOR ELECTRIC BRAKE

TECHNICAL FIELD

The present invention relates to braking systems and, in particular, relates to an electric brake having a load sensing device.

BACKGROUND

Current vehicles are equipped with electric motor service brakes for helping control vehicle braking depending on predetermined scenarios. The service brakes rely on one or more movable pistons that selectively apply force to brake pads in order to slow down or stop rotating wheel rotors on the vehicle. The electric motor direction of rotation can be reversed to release or reduce braking in emergency scenarios or drive-away conditions from a standstill on a hill.

SUMMARY

In one example, an actuator for an electric brake of a vehicle having a caliper assembly driven by an electric motor includes a gear train for converting torque from the electric motor to force applied on brake pads to brake the vehicle. The gear train includes a two stage gear assembly comprising of a driven gear and a sun gear threadably connected to one another. A load sensing device senses a thrust load applied by the sun gear in response to torque generated by the motor during a braking operation. In order to achieve a desired clamp force, a controller is connected to the load sensing device and configured to adjust the torque applied by the electric motor to the gear train in response to receiving signals from the load sensing device indicative of the thrust load or clamp force.

In another example, an actuator for an electric brake of a vehicle having a caliper assembly driven by a motor includes a gear train for transferring torque from the motor to the caliper assembly to brake the vehicle. The gear train includes a driven gear and a sun gear threadably connected to one another. A load sensing device is aligned with a rotational axis of the sun gear and includes a cap and a load sensing member positioned between the cap and an axial end surface of the sun gear for measuring a thrust load applied by the sun gear in response to clamp force generated during a braking operation. A controller is connected to the load sensing device and configured to adjust the torque applied to the gear train in response to receiving signals from the load sensing device indicative of the thrust load or clamp force.

In another example, a method of controlling a caliper assembly of a vehicle includes applying current to a motor for actuating the caliper assembly to initiate a braking event. Rotation of the motor is monitored during the caliper assembly actuation. A thrust load of a sun gear in a gear train transferring torque from the motor to the caliper assembly is sensed. The torque level output from the motor is controlled per the sensed thrust load to reach the target clamp force.

Other objects and advantages and a fuller understanding of the invention will be had from the following detailed description and the accompanying drawings.

DETAILED DESCRIPTION

Figure 1:
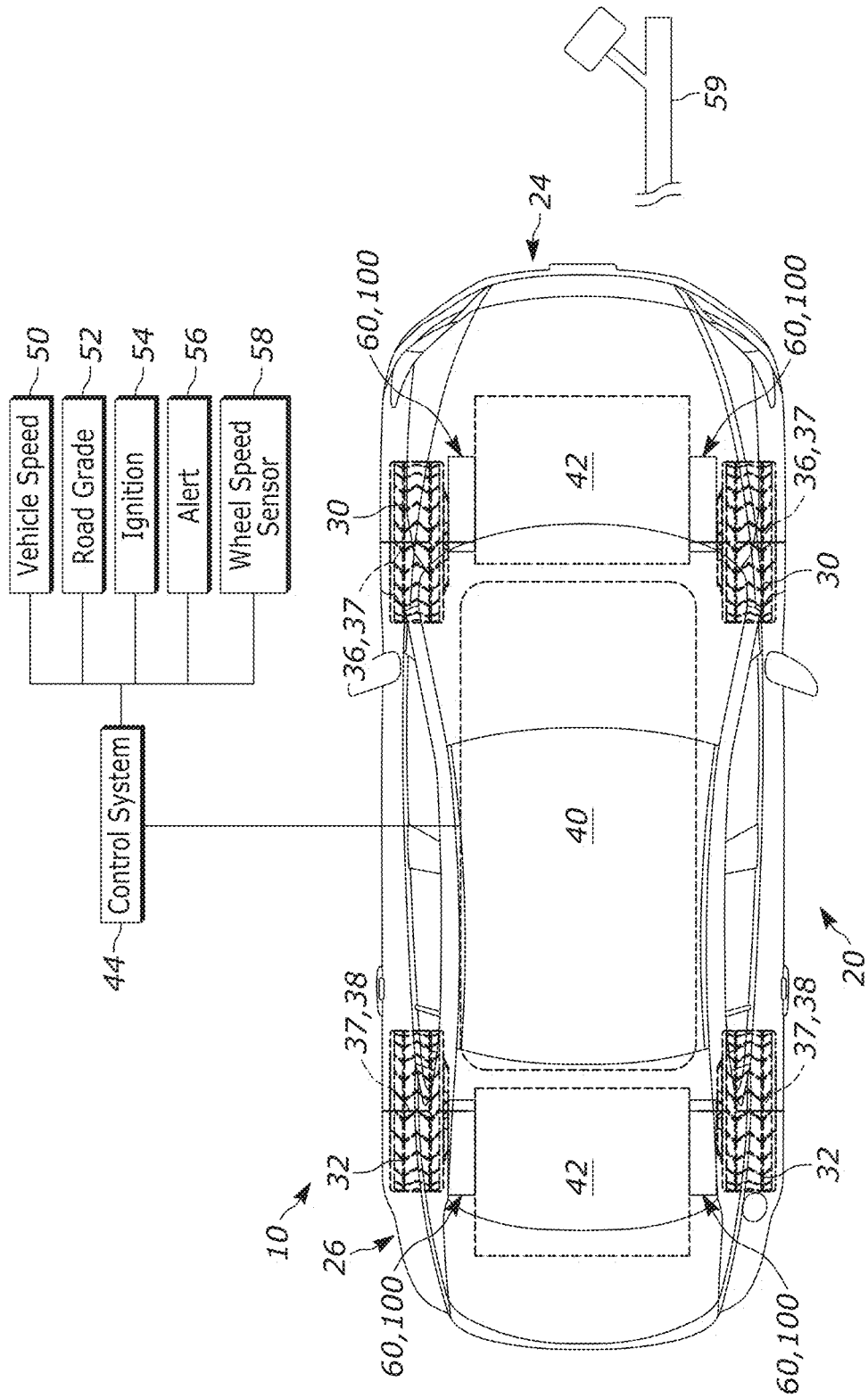
FIG. 1 is a schematic illustration of a vehicle having a braking system.
Figure 2:
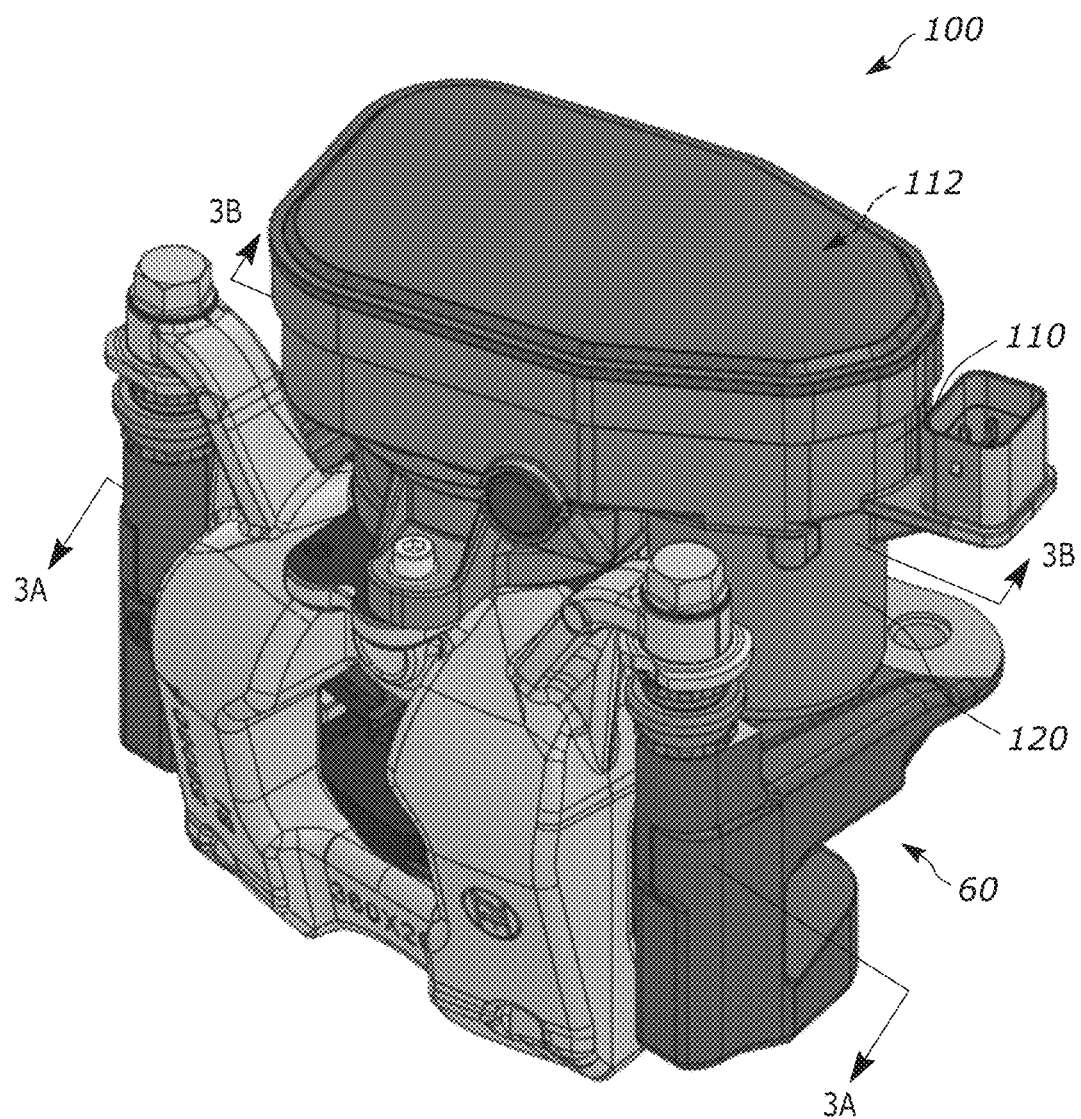
FIG. 2 is a perspective view of an example caliper assembly and actuator for the braking system of FIG. 1.

The present invention relates to braking systems and, in particular, relates to an electric brake having a load sensing device. FIG. 1 illustrates an example electric brake/braking system 10 for a motor vehicle 20 in accordance with the present invention. The vehicle 20 can be an electric, hybrid or internal combustion engine powered vehicle.

The vehicle 20 extends from a first or front end 24 to a second or rear end 26. A pair of steerable wheels 30 is provided at the front end 24. Each wheel 30 includes a wheel rotor 36 driven and steered by a steering linkage (not shown). A pair of steerable or non-steerable wheels 32 is provided at the rear end 26. Each wheel 32 includes a wheel rotor 38 driven by a steering linkage (not shown). Friction brake pads 37 are associated with each wheel rotor 36, 38 and positioned on opposite sides thereof.

In the case of an electric vehicle, a battery 40 supplies power to the vehicle 20 and cooperates with front and/or rear powertrains 42 to supply torque to the wheels 30. In other words, the battery 40 forms part of the vehicle propulsion system.

Figure 3A:
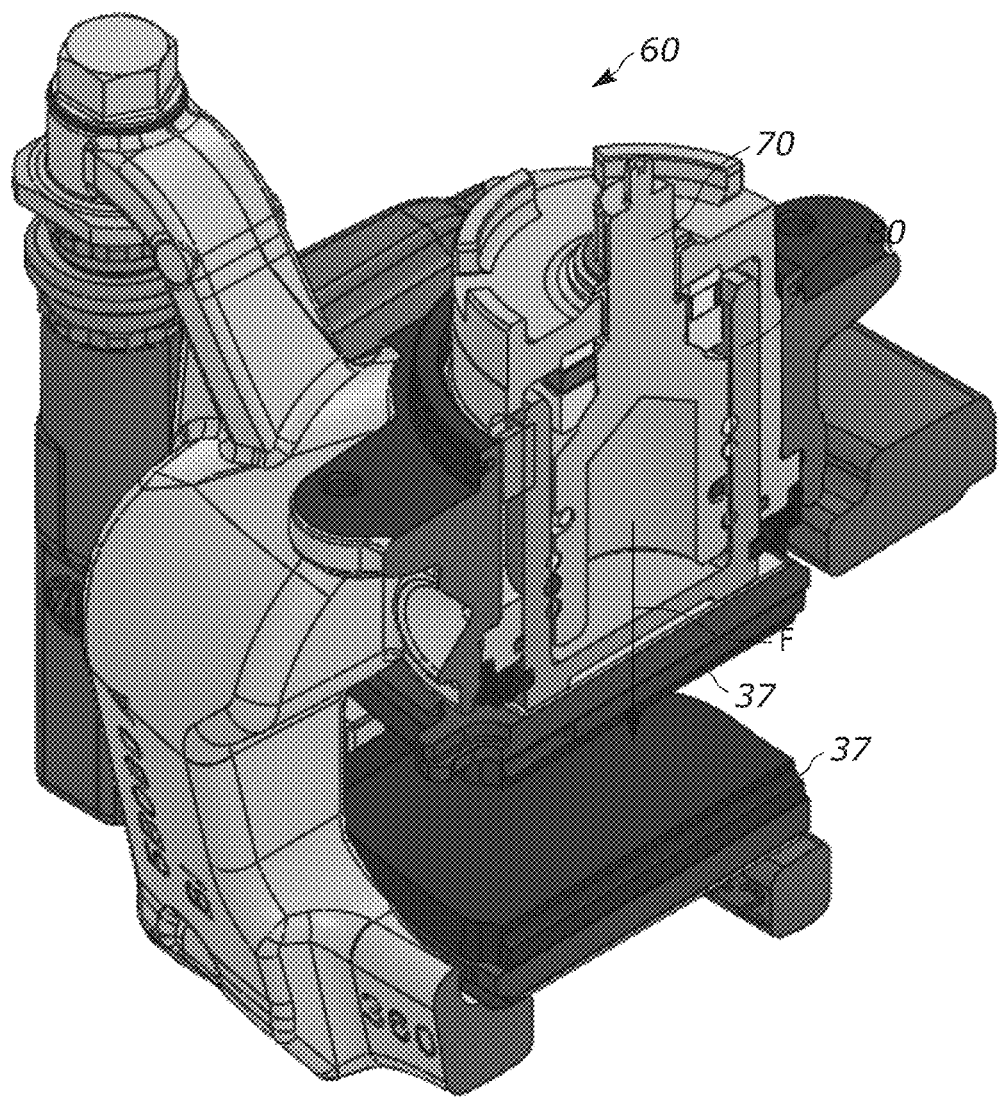
FIG. 3A is a section view of the caliper taken along line 3A-3A in FIG. 2.

A caliper or caliper assembly 60 is provided on at least one of the wheel rotors 36, 38 and controls both service braking and the parking brake associated with that wheel rotor. As shown, each wheel rotor 36, 38 on the front and rear ends 24, 26 includes a caliper assembly 60. The caliper assembly 60 is an electromechanical brake and therefore does not rely on or require hydraulic fluid to operate. As shown in FIG. 3A, the caliper assembly 60 includes a spindle 70 and a piston 80 operably coupled thereto for selectively applying braking force F to the rotor 36 or 38 via the brake pads 37 in a known and controllable manner.

The caliper assembly 60 can be configured as a ball nut assembly (recirculating or non-recirculating), a roller screw, a ball ramp assembly or any high efficiency mechanical assembly capable of converting rotary motion of the spindle to linear motion of the piston(s). Examples of ball nut and ball ramp assemblies can be found in U.S. Pat. No. 9,976,614 and U.S. Patent Publication No. 2019/0331180, the entirety of which are incorporated herein by reference.

A control system 44 is provided to help control operation of the vehicle 20, such as operation of the propulsion system and vehicle braking, including operation of the caliper assemblies 60. To this end, the control system 44 can include one or more controllers, such as a propulsion system controller, motor controller, and/or brake controller. That said, the control system 44 is connected to and receives signals from various sensors that monitor vehicle functions and environmental conditions.

For example, a vehicle speed/acceleration sensor 50 monitors the vehicle speed and acceleration and generates signals indicative thereof. A road grade sensor 52 can detect or calculate the slope of the road on which the vehicle 20 is driving and generate signals indicative thereof. An ignition sensor 54 generates signals indicative of ignition status. A wheel speed sensor 58 is provided on/adjacent to each wheel 32 and generates signals indicative of the speed at each wheel. The control system 44 also receives signals indicative of the degree—including velocity and acceleration—a brake pedal 59 is depressed.

The control system 44 can receive and interpret these signals and perform vehicle functions, e.g., braking, in response thereto. In one example, the control system 44 can detect wheel slip between one or more wheels 30, 32 and the driving surface based on the sensors 50, 58 and perform anti-lock braking (ABS) and/or electronic stability control (ESC) using one or more caliper assemblies 60. The control system 44 can also be connected to an alert 56 for notifying the driver/operator of the vehicle 20 of vehicle conditions, vehicle status, braking operations, and/or environmental conditions.

Figure 3B:
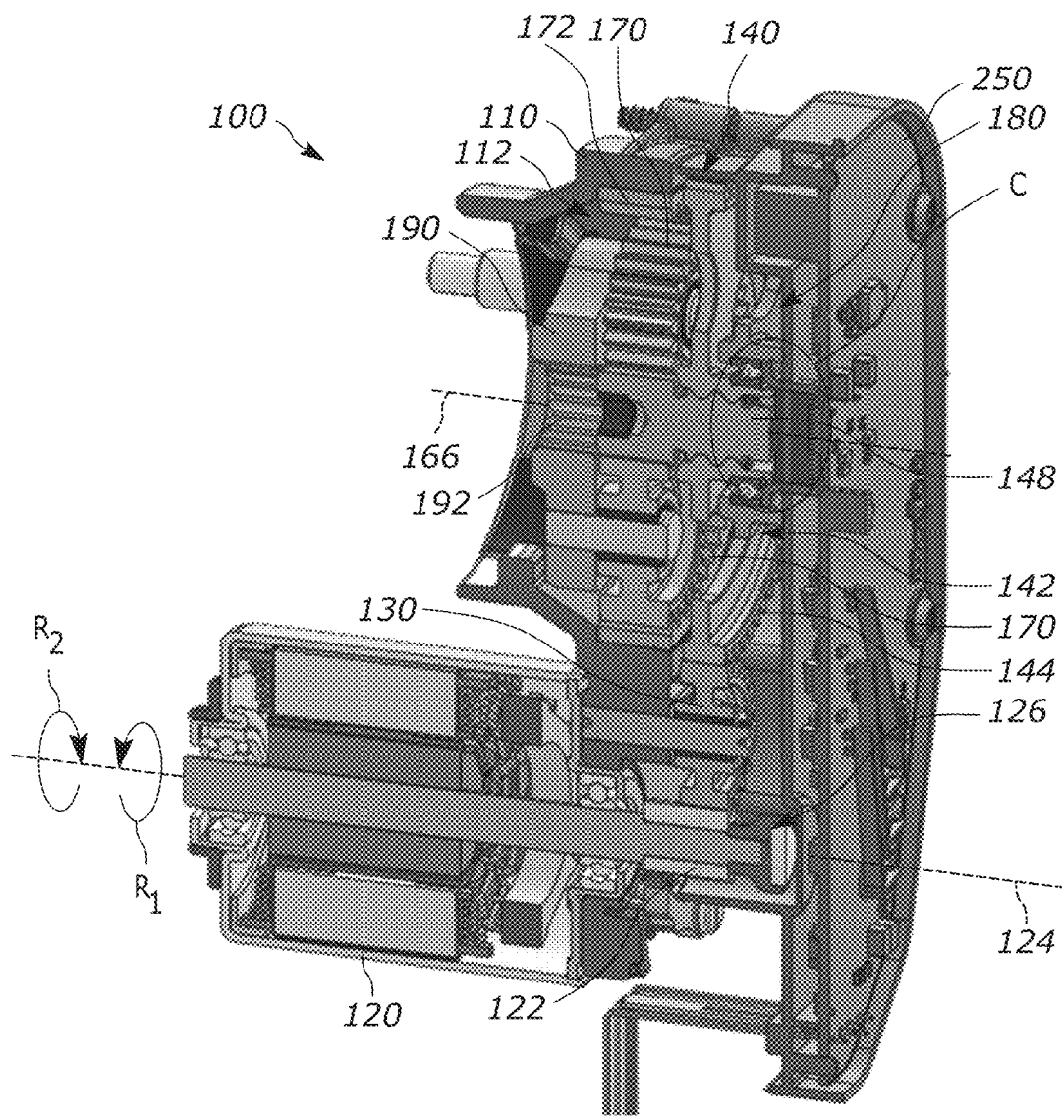
FIG. 3B is a section view of the actuator taken along line 3B-3B in FIG. 2.

Referring to FIG. 3B, the actuator 100 includes a housing 110 defining an interior space 112. A motor 120 is connected to the housing 110 and includes output pinion or motor gear 122. The motor 120 is actuated to rotate the motor gear 122 in the manners $R_1$ or $R_2$ (counterclockwise or clockwise, respectively, as shown). A sensor 126, e.g., a magnetic position sensor, tracks the rotational position of the motor gear 122 relative to the axis 124.

Figure 4A:
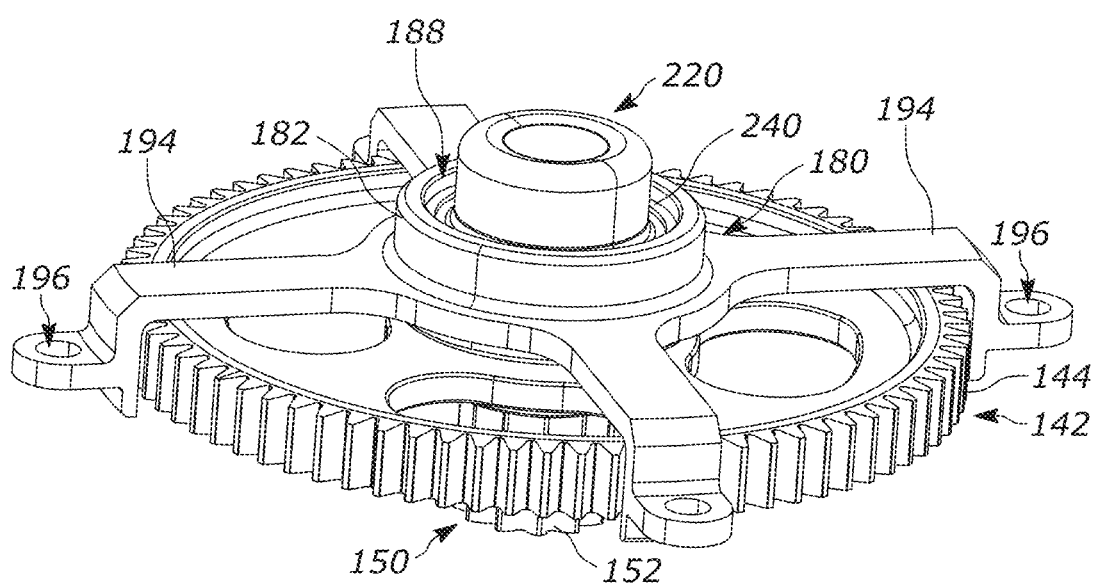
FIG. 4A is a perspective view of a portion of the actuator.
Figure 4B:
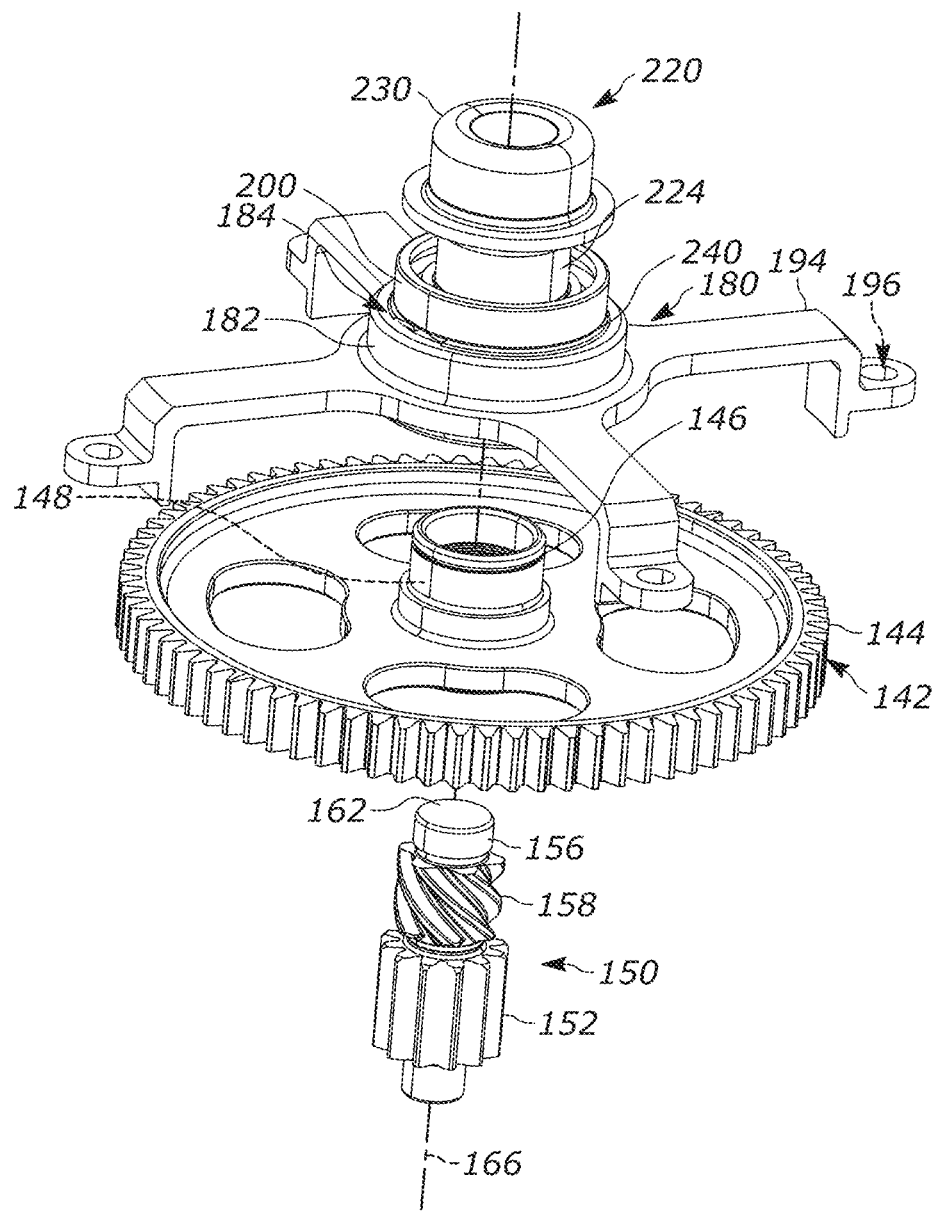
FIG. 4B is an exploded view of the actuator portion of the FIG. 4A.

A gear train 140 is provided in the interior space 112 and connected to the caliper assembly 60 for transferring torque from the motor 120 to the spindle 70. Consequently, the gear train 140 can include the motor gear 122. The gear train 140 further includes, for example, a planetary gear train having a driven gear 142 with teeth 144 (see FIGS. 4A-4B). A hollow projection 146 extends from the driven gear 142 and includes interior threads 148. An idler gear 130 is meshed with the motor gear 122 and the driven gear 142 for transferring torque therebetween.

The gear train 140 further includes a sun gear 150 having teeth 152. A projection 156 extends longitudinally from the sun gear 150 to an axial end surface 162. The projection 156 also includes exterior threads 158. The threads 158 are configured to mate with the threads 148 on the driven gear 142. In one example, the threads 148, 158 have a fast lead, and thus a high mechanical efficiency connection with one another, e.g., at least about 75% efficiency.

Planet gears 170 are rotatably mounted on a carrier 190 and meshed with the sun gear 150 and with a ring gear 172. In particular, each planet gear 170 meshes with the teeth 152 on the sun gear 150 and the teeth on the ring gear 172. The planet gears 170 orbit the sun gear 150 within the ring gear 172 in response to rotation of the carrier 190 or rotation of the driven gear 142 in a known manner. It will be appreciated that gear trains different than that shown can be used to transfer torque from the motor 120 to the spindle 70. This can include, for example, more or less gears than shown in the gear train 140 and/or different gears than those illustrated and described.

Returning to FIGS. 4A-4B, a cross-member 180 is provided for locating the gear train 140 within the housing 110.

The cross member 180 includes a cylindrical base 182 having an opening 184 for receiving the projection 146 on the driven gear 142. First and second recesses 186, 188 (FIG. 6) are provided along the opening 184. Arms 194 extend radially outward from the base 182. Each arm 194 includes an opening 196 for receiving a fastener (not shown) to secure the cross member 180 to the housing 110.

Figure 5:
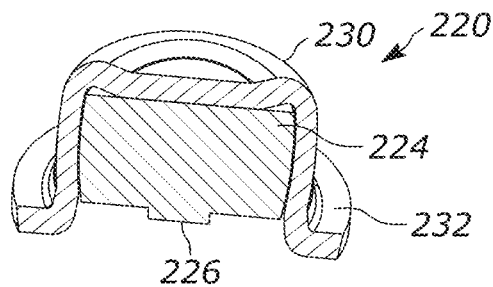
FIG. 5 is a section view of a load sensing device of the actuator.

Turning to FIG. 5, a load sensing device 220 is provided for sensing loads between the sun gear 150 and driven gear 142. The device 220 includes a load sensor 224 having a bearing surface or member 226. In one example, the bearing member 226 is a spherical surface, although other shapes and configurations are contemplated. A cap 230 extends over and covers the load sensor 224. The cap 230 includes an annular flange 232. The device 220 is aligned with the axis 166 of the sun gear 150 and therefore aligned with the co-extensive centerline of the spindle 70 and piston 80.

Figure 6:
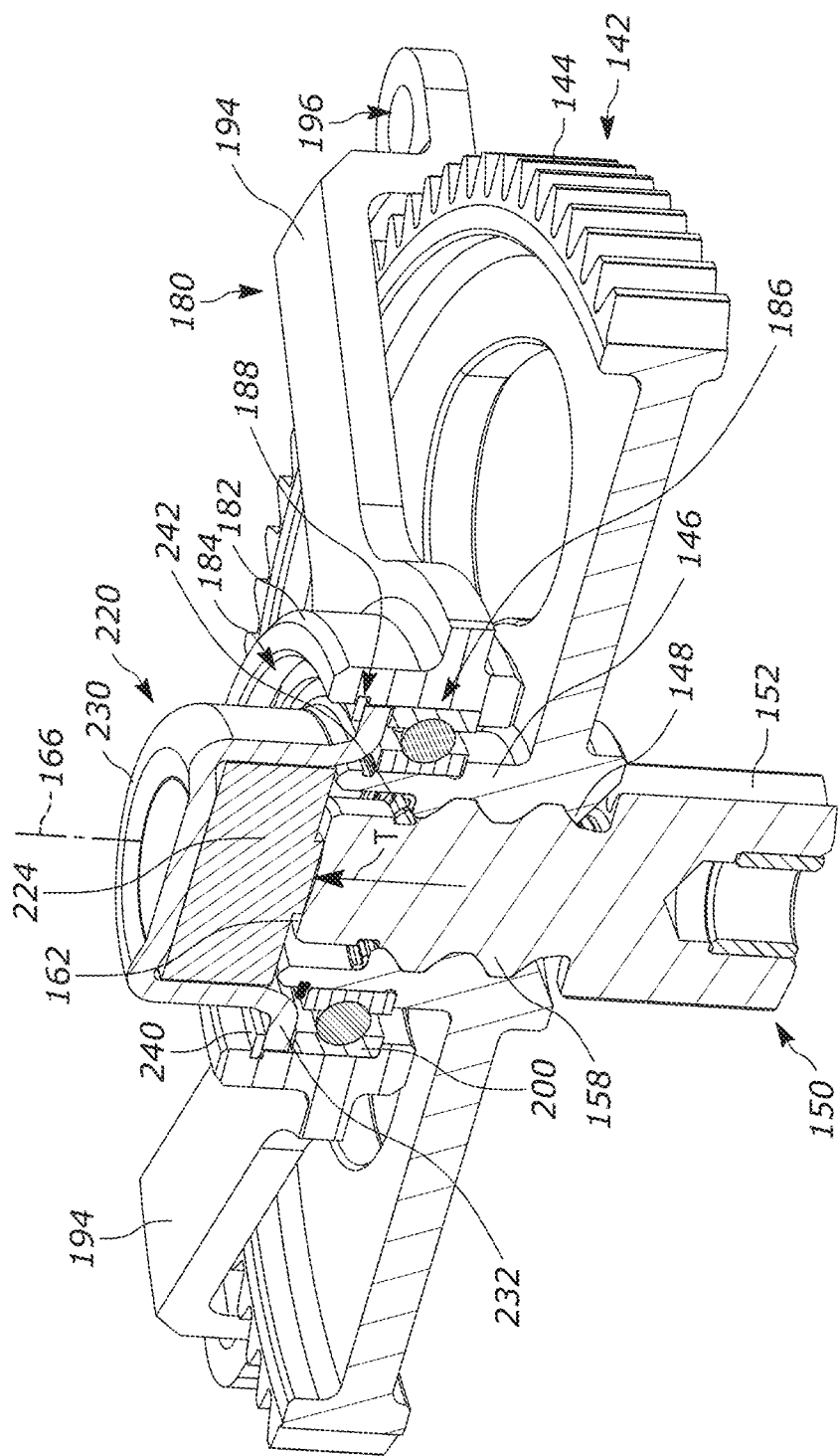
FIG. 6 is a section view of the actuator during a braking operation.

As shown in FIG. 6, when the actuator 100 is assembled, a bearing 200 is provided in the first recess 186 and receives the projection 146 of the driven gear 142 for locating the driven gear within the housing 110. The flange 232 of the cap 230 abuts the bearing 200. A retaining ring 240 is provided in the second recess 188 to pin the flange 232 between the retaining ring and the bearing 200. This positions the bearing member 226 of the load sensor 224 against the axial end surface 162 of the sun gear 150.

The sun gear 150 and driven gear 142 are formed from separate components that are threadably engaged via the fast lead connection 148, 158. The sun gear 150 is retained in position with respect to the driven gear 142 via a spring retainer 242. In other words, the spring retainer 242 helps prevent relative axial movement between the sun gear 150 and driven gear 142, especially in the release direction when rotation of the sun gear 150 may tend to tread out of engagement with the driven gear 142.

Figure 7:
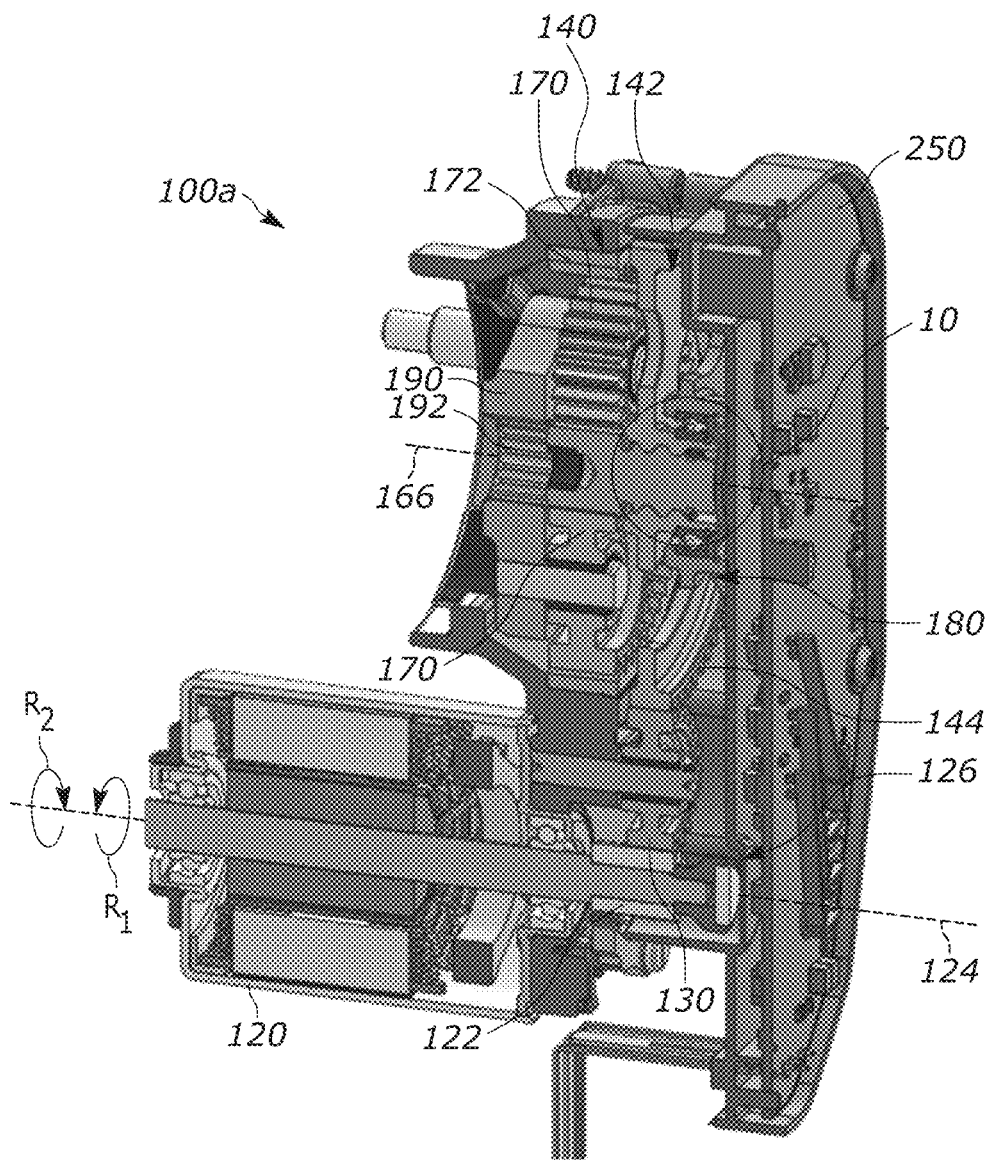
FIG. 7 is a section view of another example actuator for the braking system.

As shown in FIG. 7, the carrier 190 includes splines 192 for mating with the spindle 70 to transfer torque therebetween. Rotation of the sun gear 150 causes the carrier 190 and the spindle 70 to rotate, which results in adjustment of the longitudinal position of the piston 80 for applying/releasing clamp force on the rotor 36 or 38 in a controlled manner. The cap 262 helps to prevent axial movement of the sun gear 150 relative to the driven gear 142. To this end, the retaining ring 240 helps clamp the flange 264 in place and thereby prevent the cap 230 from moving during braking operations.

With this in mind, the gear train 140 is configured such that rotation of the pinion or motor gear 122 in the manner $R_1$ (see also FIG. 3B) results in advancing the piston 80 towards the rotor 36 or 38 to brake the vehicle 20. On the other hand, rotation of the motor gear 122 in the manner $R_2$ results in the piston 80 retreating away the rotor 36 or 38 to reduce or release braking of the vehicle 20.

During operation of the vehicle 20, a service brake apply demand is initiated by the system and/or vehicle operator. In this example, service braking is provided for a single, rear end 26 wheel rotor 38 (see FIG. 1). The brake demand is based on signals received by the control system 44 due to brake pedal 59 depression by a driver or due to automatic vehicle safety systems, e.g., collision avoidance systems. With this in mind, the control system 44 activates the motor 120 (see FIGS. 3A-3B) to rotate in a brake apply direction $R_1$ to supply torque to the spindle 70 along the aforementioned flow path. This, in turn, causes the piston 80 to apply a braking force F to the brake pad 37, thereby braking the rotor 38. Rotation of the motor 120 continues until the vehicle 20 responds in accordance with the commanded brake event, at which point the motor has a particular current draw. That said, the control system 44 controls the caliper assembly 60 according to its model-based design, which establishes the correlation between a particular current draw of the motor 120 and a resulting braking force F applied to the rotor 38.

It will be appreciated that rotation speed and torque of the motor 120 can be controlled precisely using, for example, pulse with modulation (PWM) control. For example, the degree and/or rate of braking force F on the pad 37 during braking can be finely tuned as well as the degree and/or rate of braking force reduction during an ABS event. The control system 44 can rely on signals from any of the sensors indicating, for example, road surface conditions, in controlling PWM.

In any case, and returning to FIG. 6, as the motor 120 rotates, torque is transferred through the motor gear 122, the idler gear 130, and to the driven gear 142. Due to the fast lead connection 148, 158 between the sun gear 150 and the driven gear 142, torque applied to the driven gear causes the sun gear to attempt to move longitudinally along the axis 166 towards the load sensing device 220. The contact between the axial end surface 162 and bearing member 226, however, prevents actual axial movement. In other words, the load sensing device 220 prevents axial movement of the sun gear 150 to enable torque transmission between the driven gear 142 and the sun gear 150. This, in turn, enables the sun gear 150 to deliver torque to the rest of the planetary gear train 140 and spindle 70 to advance the piston 80.

That said, the sun gear 150 applies a thrust load T to the bearing member 226 that is sensed by the load sensor 224. This thrust load T is directly related to, e.g., directly proportional to, the braking force F applied by the piston 80 to the rotor 38. Consequently, the control system 44 can correlate the sensed thrust load T to the applied braking force F. At the same time, the control system 44 relies on a magnetic position sensor 126 to track rotation of the motor 120. The control system 44 is programmed with the expected or theoretical correlation between the rotational position of the motor 120 and the thrust load T to thereby infer braking force F.

Certain factors, however, may cause the rotational position of the motor 120 to deviate from the expected braking force F at the rotor 38. This can include, for example, tolerances in the gear train 140, idler gear 130, etc. and/or deviations in the motor 120 performance/tolerance from the expected construction. With this in mind, the control system 44 can adjust, e.g., increase, the current delivered to the motor 120 until the sensed thrust load T reaches an amount equivalent to a desired braking force F at the rotor 38. Since each wheel 36, 38 has an associated caliper assembly 60 and actuator 100, the control system 44 can precisely and independently control the braking force F at each rotor 38 by monitoring the respective motor 120 rotational position and thrust load T at the respective load sending device 220. This precise control enables the control system 44 to account for variations in and between the caliper assemblies 60, actuators 100, brake pads, etc.

When braking is reduced or terminated, the control system 44 rotates the motor 120 in the direction $R_2$ (FIG. 3A) to retract the piston from the rotor. The fast lead connection 148, 58 allows the retracting piston to back drive the motor 120 through the spindle 70, and the gear train 140 which also includes the idler gear 130, and motor gear 122. It will be appreciated that the bearing member 226 can abut the axial end surface 162 of the sun gear 150 at all times. An additional thrust bearing (not shown) may be positioned axially between the bearing member 226 and the axial end surface 162, if needed. Furthermore, the fast lead connection 148, 158 may be configured such that an insignificant amount of axial movement of the sun gear relative to the load sensing device occurs. In any case, the load sending device 220 and fast lead connection 148, 158 are configured such that the thrust load T during braking operations is smaller than or equal to the capacity of the load sending device under all reasonably expected operating conditions.

Figure 8:
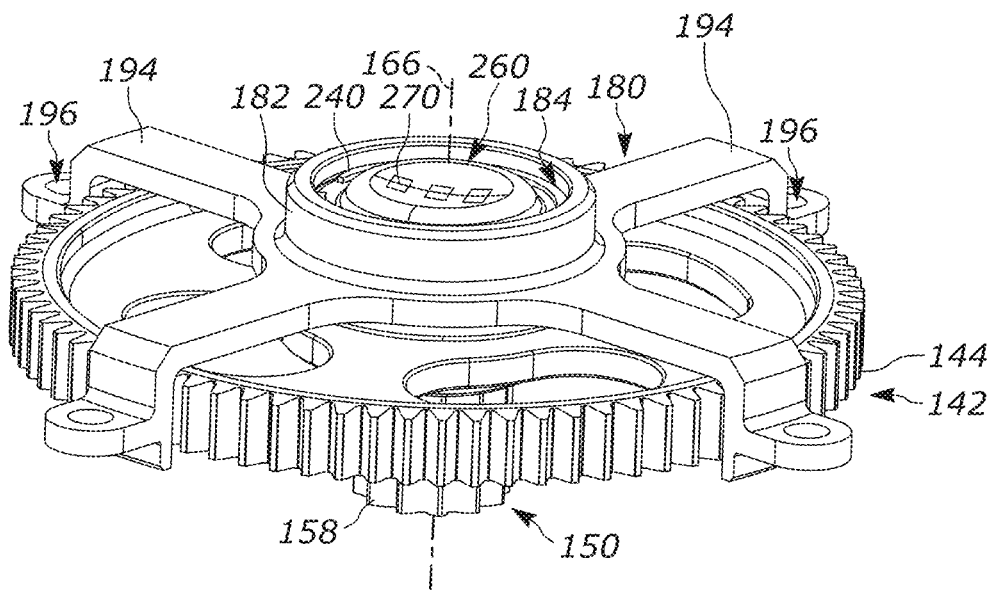
FIG. 8 is a perspective view of a portion of the actuator of FIG. 7.
Figure 9:
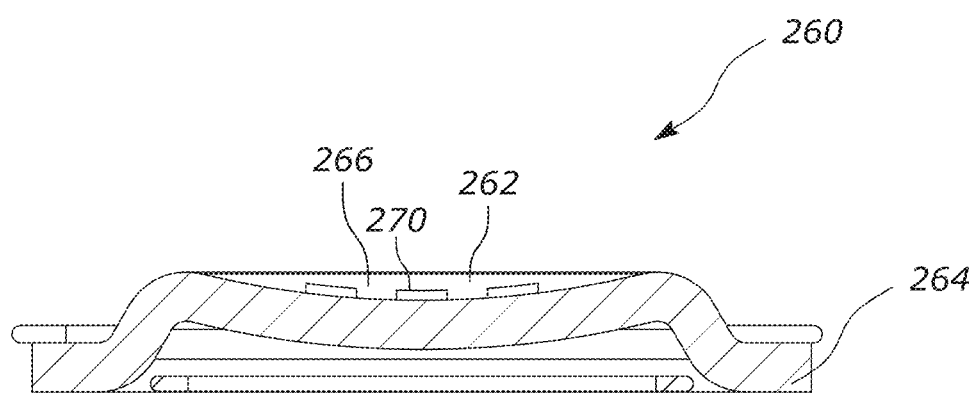
FIG. 9 is a section view of a load sensing device of the actuator of FIG. 7.

FIGS. 7-10 illustrate another example actuator 100a in accordance with the present invention. Features in FIGS. 7-10 that are similar to the features in FIGS. 1-6 are given the same reference number. Referring to FIGS. 7-9, the actuator 100a includes a load sensing device 260 for sensing the thrust load T applied by the sun gear 150 to the load sensing device. The load sensing device 260 includes a cap 262 having an annular flange 264. The flange 264 abuts the bearing 200 (FIG. 10) and is held in place by the retaining ring 240. The cap 262 can have a generally domed shape and includes an outer surface 266.

Figure 10:
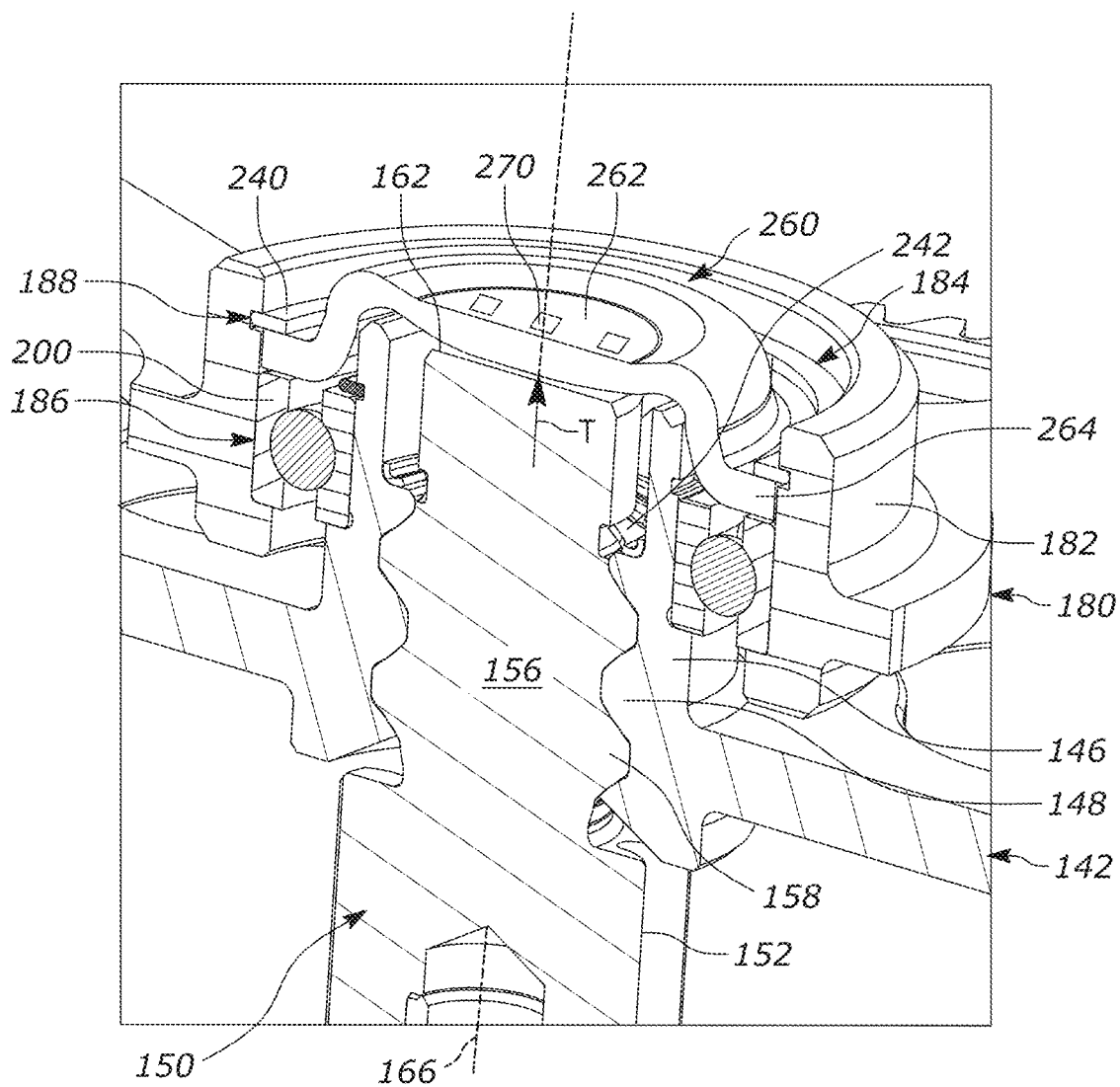
FIG. 10 is a section view of the actuator of FIG. 7 during a braking operation.

At least one load sensing member, such a strain gage 270, is secured to the outer surface 266. Alternatively or additionally, at least one strain gage 270 can be secured to an inner surface (not shown) of the cap 262. In this example, multiple strain gages 270 are provided, although a single strain gage could alternatively be provided along the surface 266 (not shown). In any case, when the load sensing device 260 is installed, the strain gages 270 are generally located to optimally detect thrust load T between the cap 262 and the axial end surface 162 of the sun gear 150 (FIG. 10).

That said, the strain gage 270 senses the thrust load T applied by the sun gear 150 along the axis 166 during braking operations. The control system 44 monitors the rotational position of the motor 120 and the sensed thrust load T and adjusts, e.g., increases, the current applied to the motor until the thrust load reaches a desired amount. Since the thrust load T is directly related to the braking force F, the control system 44 can adjust the motor 120 current until the desired braking force F is achieved at each rotor 36 and/or 38 where braking is desired.

The load sensing device of the present invention is advantageous in that it enables the control system to correct the motor current applied to any/all of the caliper assemblies to help ensure the braking force is both correct in terms of desired degree and distribution amongst the wheels. The load sensing device also allows the control system to adapt over time to changes in component interrelation, wear, motor deterioration or reduction in performance, etc.

The load sensing device is capable of providing these advantages specifically because the driven gear and sun gear and formed as separate components. In other words, mechanical separation is provided between the two components. Consequently, torque between the two gears can not only exist but also be detected by preventing axial movement of the sun gear and measuring the resulting thrust load.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. An actuator for an electric brake of a vehicle having a caliper assembly driven by a motor, comprising:
   a gear train for transferring torque from the motor to the caliper assembly to brake the vehicle, the gear train including a driven gear and a sun gear connected to one another, the driven gear and the sun gear have a threaded connection with one another;
   a load sensing device for sensing a thrust load applied by the sun gear in response to torque generated by the motor during a braking operation; and
   a controller connected to the load sensing device and configured to adjust the torque applied to the gear train in response to receiving signals from the load sensing device indicative of the thrust load.

2. The actuator of claim 1, wherein the threaded connection is at least 75% efficient.

3. The actuator of claim 1, wherein the load sensing device comprises:
   a cap;
   a load sensing member positioned between the cap and an axial end surface of the sun gear for measuring a thrust load provided by the sun gear during braking operations.

4. The actuator of claim 3, wherein the load sensing member comprises a resilient load cell.

5. The actuator of claim 1, wherein the load sensing device includes a spherical surface for engaging an axial end surface of the sun gear.

6. The actuator of claim 1, wherein the load sensing device comprises a cap and at least one strain gage secured to or mounted to a surface of the cap, the cap receiving the thrust load from the sun gear.

7. The actuator of claim 1, wherein a load sensing direction of the load sensing device is aligned with a rotational axis of the sun gear.

8. The actuator of claim 1, wherein the load sensing device prevents axial movement of the sun gear relative to the driven gear to enable torque transmission between the driven gear and the sun gear.

9. An actuator for an electric brake of a vehicle having a caliper assembly driven by a motor, comprising:
   a gear train for transferring torque from the motor to the caliper assembly to brake the vehicle, the gear train including an driven gear and a sun gear threadably connected to one another;
   a load sensing device aligned with a rotational axis of the sun gear, comprising:
   a cap;
   a load sensing member positioned between the cap and an axial end surface of the sun gear for measuring a thrust load applied by the sun gear in response to torque generated by the motor during a braking operation; and
   a controller connected to the load sensing device and configured to adjust the torque applied to the gear train in response to receiving signals from the load sensing device indicative of the thrust load.

10. The actuator of claim 9, wherein the load sensing member comprises a resilient load cell.

11. The actuator of claim 10, wherein the load cell includes a surface for engaging the axial end surface of the sun gear.

12. The actuator of claim 9, wherein the driven gear and the sun gear have a threaded connection with one another with at least a 75% efficiency.

13. The actuator of claim 9, wherein the load sensing device prevents axial movement of the sun gear relative to the driven gear to enable torque transmission between the driven gear and the sun gear.

14. A method of controlling the actuator of claim 1, comprising the steps of:
   applying current to the motor for actuating the caliper assembly to initiate a braking operation;
   monitoring rotation of the motor during the caliper assembly actuation;
   sensing a thrust load applied by the sun gear; and
   adjusting the current applied to the motor until the sensed thrust load reaches a predetermined amount.

15. The method of claim 14, wherein the thrust load is applied to a load sensing device comprising a load cell.

16. The method of claim 14, wherein the thrust load is applied to a load sensing device comprising at least one strain gage.

17. The method of claim 14, wherein adjusting the current applied to the motor comprises increasing the current applied to the motor until the sensed thrust load reaches the predetermined amount.

* * * * *